United States Patent [19]
Ellis

[11] Patent Number: 4,809,535
[45] Date of Patent: Mar. 7, 1989

[54] HYDRAULIC PRESS AND PROCESS FOR MOLDING OR FORMING AN ARTICLE INCLUDING INCREMENTALLY VARIABLE POSITIONED SLIDE

[75] Inventor: David L. Ellis, Moline, Ill.
[73] Assignee: Williams-White Company, Moline, Ill.
[21] Appl. No.: 62,802
[22] Filed: Jun. 15, 1987
[51] Int. Cl.[4] .............................................. B21J 9/12
[52] U.S. Cl. ............................ 72/453.02; 72/453.06; 72/453.08; 72/444; 100/269 R
[58] Field of Search ........... 72/453.02, 453.06, 453.08, 72/454, 444, 453.04, 453.03, 453.07, 446, 448, 441, 442; 100/269 R, 269 B, 270, 274, 275

[56] References Cited

U.S. PATENT DOCUMENTS

| 2,980,013 | 4/1961 | Swick et al. ............... 100/269 B |
| 4,375,781 | 3/1983 | Bessho ....................... 100/269 B |
| 4,603,573 | 8/1986 | Ganago et al. ................. 72/454 |
| 4,691,553 | 9/1987 | Barber .......................... 72/441 |

FOREIGN PATENT DOCUMENTS

| 0001294 | 1/1981 | Japan ........................ 100/269 B |
| 0706173 | 1/1980 | U.S.S.R. ........................ 72/454 |

Primary Examiner—David Jones
Attorney, Agent, or Firm—Henderson & Sturm

[57] ABSTRACT

The apparatus and process of a hydraulic press (20) for molding or forming an article, which apparatus has a frame (21) with a top unit (22) and a base unit (23) interconnected to the top unit (22); a slide (28) adapted to have an upper half (38) of a mold attached thereto; first hydraulic device (31) interconnected between the top unit (22) and the slide (28) for controllably moving the slide (28) vertically relative to the frame (21); a bed (36) fixed on the frame (21) and adapted to have a lower half (37) of the mold attached thereto, the lower mold half (37) adapted to have an article to be molded placed therein; second hydraulic device (39) connected to said top unit (22) and including at least one elongated ram (41), the second device (39) controllably moving the ram (41) vertically relative to the slide (28) and releasably lockable to the ram (41) at any predetermined location lengthwise of the ram (41), the positioning being incrementally variable, whereby vertical movement of the ram (41) is transmittable via said locking device (42) to the slide (28) to move the slide (28) to engage the mold halves (37), (38) for forming the article.

13 Claims, 5 Drawing Sheets

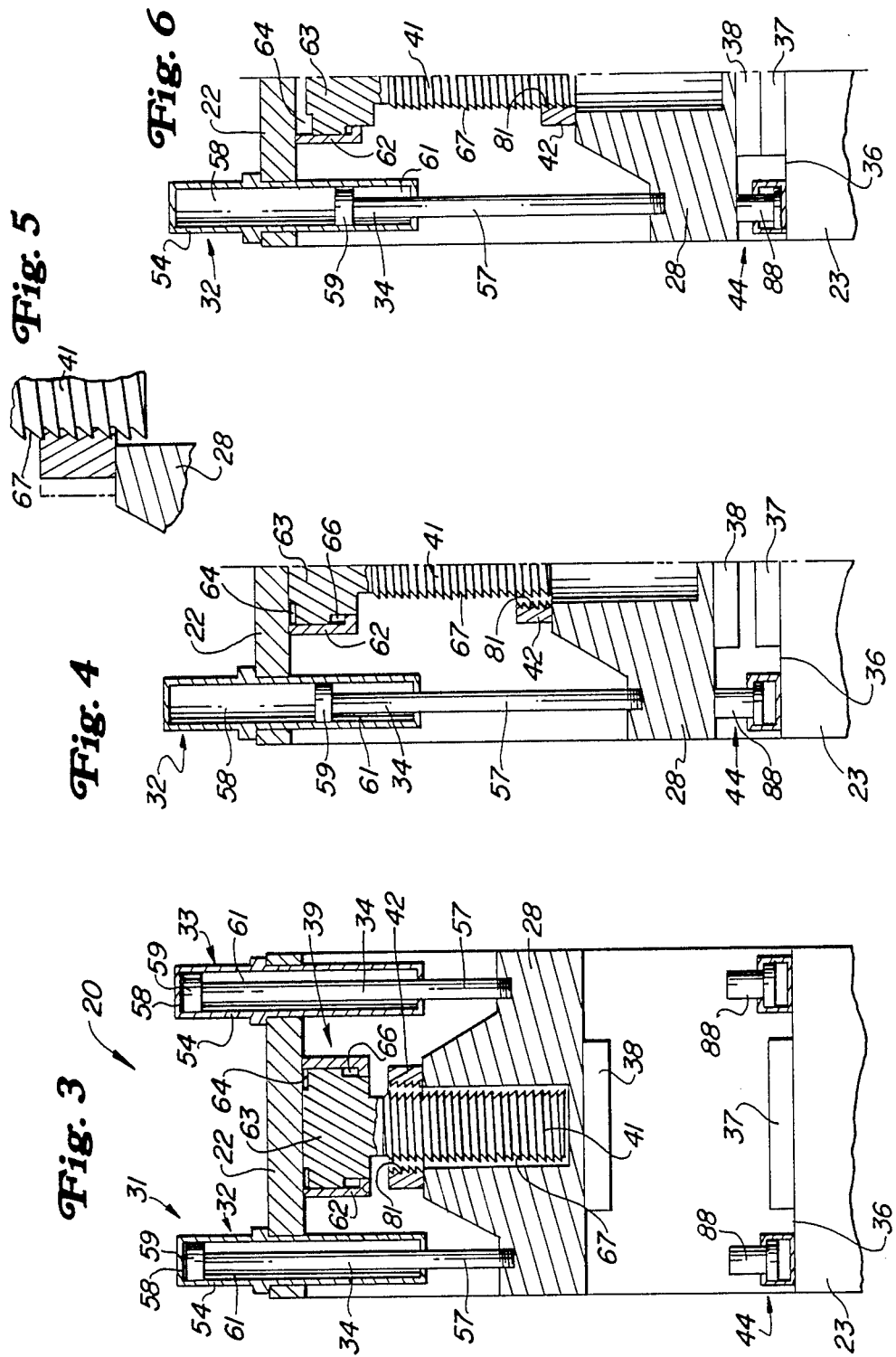

HYDRAULIC PRESS AND PROCESS FOR MOLDING OR FORMING AN ARTICLE INCLUDING INCREMENTALLY VARIABLE POSITIONED SLIDE

TECHNICAL FIELD

The structure of this invention relates generally to a hydraulic press for molding or forming an article, and more particularly to an apparatus and process wherein a pressing slide can be positively locked to the main hydraulic ram of a press at programmable, incrementally variable locations lengthwise of the ram.

BACKGROUND ART

A hydraulic press for molding or forming an article is known, which press includes a frame having a top unit, a base unit, and rods tying the top and bottom units together; a slide having the upper half of a mold secured thereto and vertically moveable by a first pair of hydraulic cylinder units into a first position; a fixed bed having the lower half of a mold secured thereto; a main hydraulic cylinder and piston ram for vertically moving the slide into a second position where the mold halves are engaged and the article formed by pressure from the ram; and hydraulic means for separating the mold sections for removal of the article and for return of all parts to their original positions.

To complete the process, however, one type of hydraulic press requires a long stroke of the main ram requiring additionally a high degree of compression of the large volume of fluid required, both the long stroke and high compression disadvantages.

Another example advantageously restricts the stroke of the main ram and reduces the compression required of the fluid for the shorter stroke; however, once the ram is in position for the main pressing movement against the slide, a plate or shim must be inserted by mechanical equipment between the ram and the slide with a thickness depending upon the desired travel of the slide. Thus, due to the necessity of interrupting the process for a mechanical insertion of a plate of a certain thickness from a large number of plates of different thicknesses, the process is not fully programmable, and requires an additional step and element to transmit force from the ram to the slide.

Yet another example involves an attempt to clamp the slide to outer cylinder posts for a shorter stroke with less compression; however, the clamping is not positive, resulting in unsatisfactory forming.

DISCLOSURE OF THE INVENTION

The invention comprises the apparatus and process of a hydraulic press for molding or forming an article, which apparatus comprises:

a frame having a top unit and a base unit interconnected to the top unit; a slide adapted to have an upper half of a mold attached thereto; first hydraulic means interconnected between the top unit and the slide for controllably moving the slide vertically relative to the frame; a bed fixed on the frame and adapted to have a lower half of the mold attached thereto, the lower mold half adapted to have an article to be molded placed therein; second means connected to the top unit and including at least one elongated ram, the second means controllably moving the ram vertically relative to the slide; and locking means connected to the slide and releasably lockable to the ram at any predetermined location lengthwise of the ram, the positioning of the locking means being incrementally variable, whereby vertical movement of the ram is transmittable via the locking means to the slide to move the slide to engage the mold halves for forming the article.

The invention further comprises the hydraulic press apparatus wherein the second means is connected to the slide and includes an elongated ram, the second means controllably moving the ram vertically relative to the top unit; and further wherein the locking means is connected to the top unit and releasably lockable to the ram at incrementally variable locations lengthwise of the ram. Furthermore, the locking means comprises radially movable, internally threaded segments for engagement with externally formed threads on the ram for effecting a positive locking between the ram and the locking means.

The hydraulic press may include further positioning means which have a plurality of cylinder units each with a variable resistance to engagement with the slide by the cylinder units, whereby the resistance of the positioning means to downward movement of the slide is uniform in one condition, but may be nonuniform in another condition to effect a canted position of the slide; and further wherein said positioning means cylinder units are operable to force the slide upwardly to separate the mold halves for removal of the article having been formed.

The process of forming an article comprises the steps of: placing the material to be formed into the article into a mold lower half which is held on a fixed bed; moving a slide having a mold upper half secured thereto downwardly toward said mold lower half by first hydraulic means; sensing engagement of the mold halves and halting further movement of the slide by the first hydraulic means; locking the slide to the ram of a second hydraulic means by radially moving a plurality of internally threaded segments into engagement with externally formed threads on the ram; moving the slide further downwardly by operation of the second hydraulic means to engage the mold halves with each other whereby to form the article; and raising the slide to separate the mold halves whereby the formed article can be removed.

It is an object of this invention to provide an improved hydraulic press for forming or molding an article.

It is another object of this invention to provide a unique process of hydraulically forming or molding an article.

It is another object of this invention to provide an improved hydraulic press whereby the positioning of a slide prior to the pressing or forming vertical movement of the slide requires less-than-normal fluid compression, thereby permitting a short stroke of the slide for actual forming of the article concomitant with the less-than-normal fluid compression.

Yet another object of this invention is to provide a positive lock between the slide and the main ram.

Still another object of this invention is to provide a position lock between the slide and the ram at incrementally variable locations lengthwise of the ram.

A further object of this invention is to provide variable resistance means for the article forming movement of the slide whereby the forming surface of the slide can be canted off the normal horizontal plane.

Another object of this invention is to provide a hydraulic press capable of achieving the aforementioned objectives the process of which can be fully programmable.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 3 is a schematic view of the front of the hydraulic press showing the slide thereof in a raised inoperative position;

FIG. 4 is a partial schematic view similar to FIG. 3, and showing the slide moved downwardly to a reference position, in this instance engaging positioning means at the base of the press;

FIG. 5 is a detailed view of FIG. 4, showing internally threaded locking means engaged with external threads formed on the ram for effecting a positive lock therebetween;

FIG. 6 is a schematic view similar to FIG. 4, and wherein the slide has been moved further downwardly placing mold halves in engagement with each other for forming an article therein;

BEST MODE FOR CARRYING OUT THE INVENTION

Figure 1:
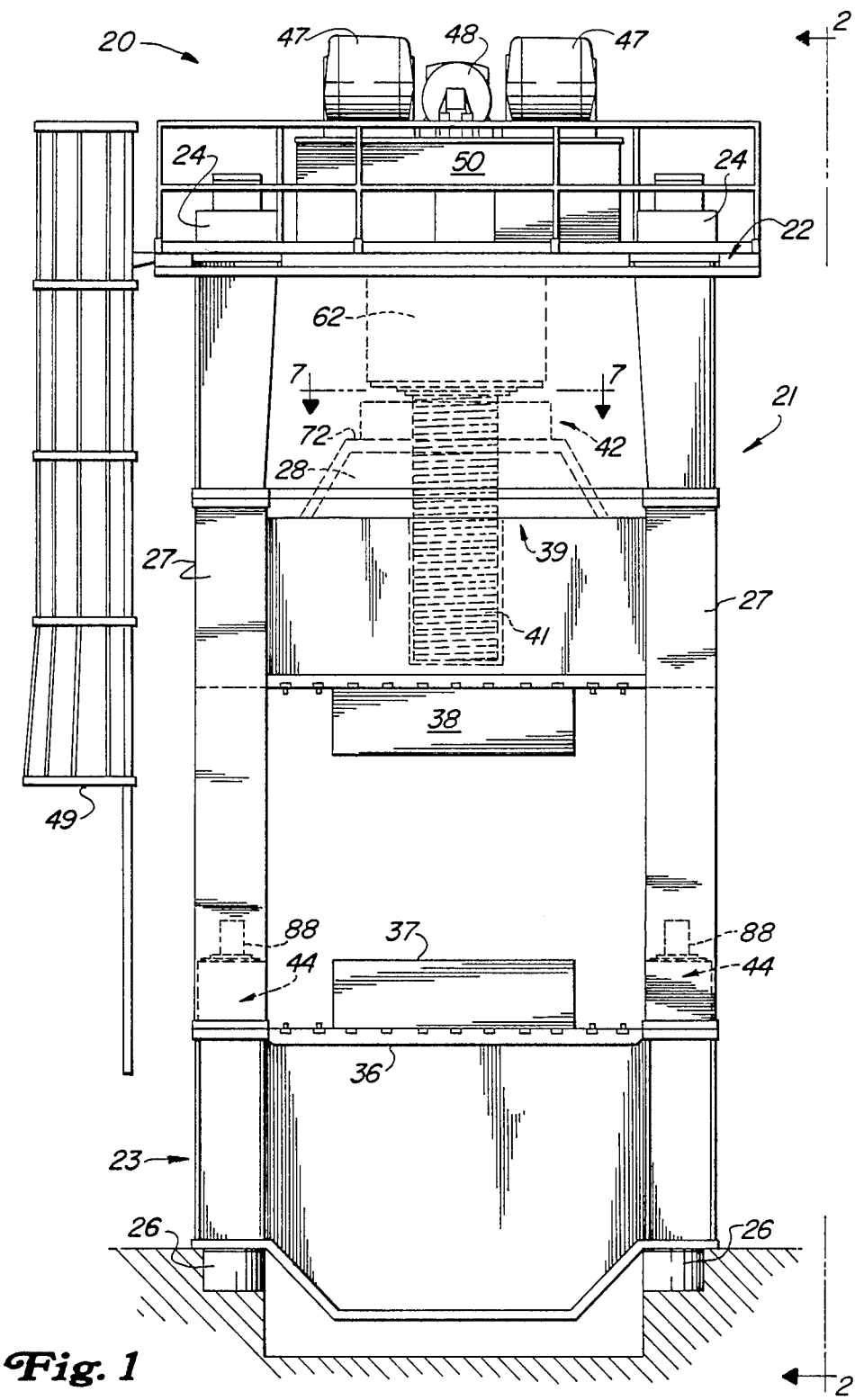
FIG. 1 is a front-elevational view of the hydraulic press of this invention, with certain parts shown in dotted lines for clarity of invention.
Figure 2:
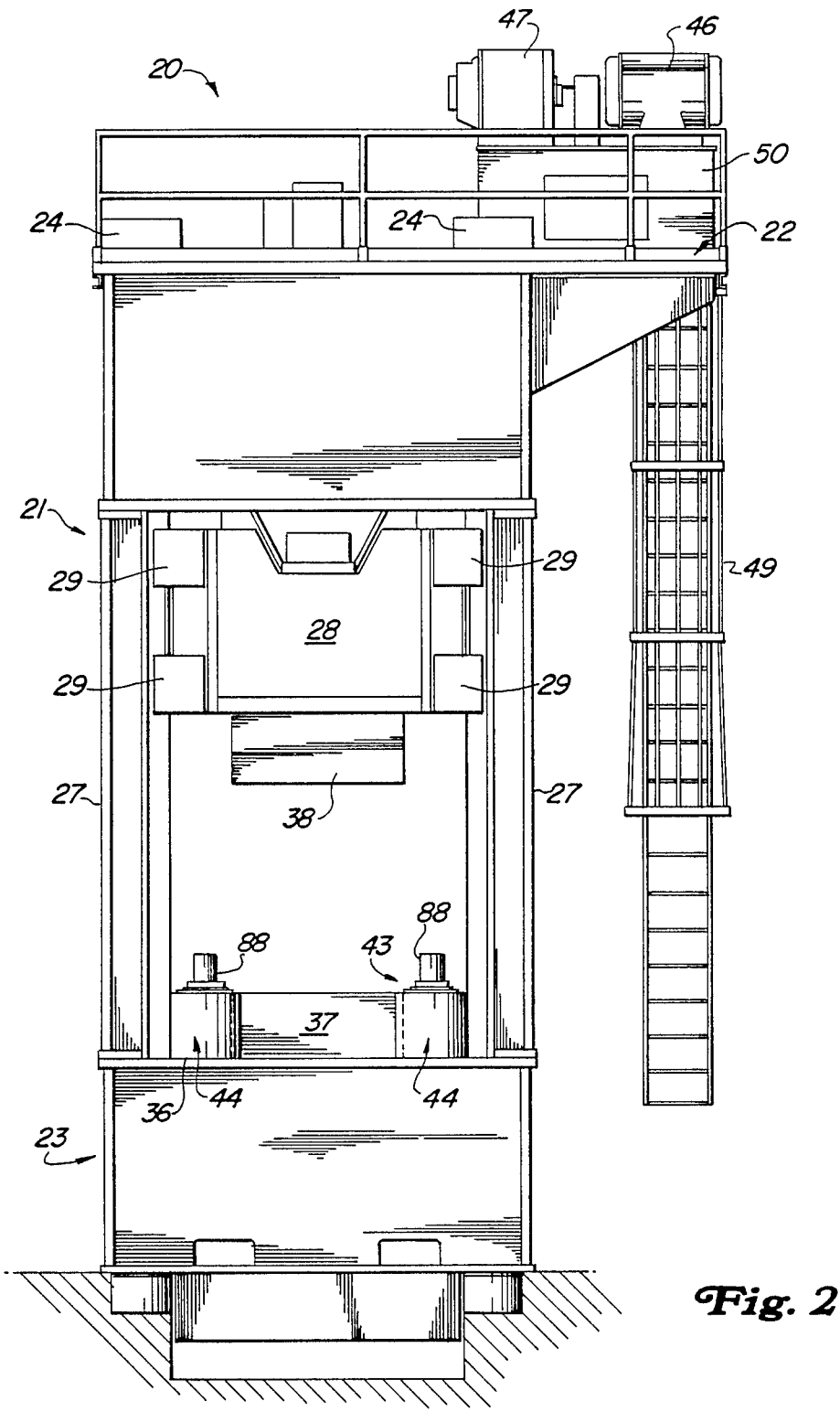
FIG. 2 is a side-elevational view of the hydraulic press of FIG. 1.

Referring now to the drawings, the hydraulic press apparatus of this invention is indicated generally at (20) in FIG. 1 and comprises basically: a frame (21) having a head or top unit (22) and a base unit (23) interconnected in this instance by tie rods, the upper and lower nut ends (24), (26) thereof showing, and which tie rods are encased in housings (27) (FIG. 2), a slide (28) vertically movable on the housings (27), and slidably retained thereon by gibs (29); and a first hydraulic device (31) comprising mainly a pair of pull back cylinder units (32), (33) mounted on the top unit (22) and with their piston rods (34) (FIG. 3) connected to the slide (28) for effecting vertical controlled movement of the slide (28) relative to the frame (21).

The hydraulic press (20) comprises further a bed (36) (FIG. 1) fixed on the frame (21) and adapted to have the lower half (37) of a mold secured thereto, which lower half (37) normally holds material to be formed into an article of manufacture (not shown). The upper half (38) of the mold is secured to the underside of the slide (28) for eventual mating engagement with the lower half (37) for forming the article. A second hydraulic device (39) (FIGS. 1 and 3) is connected to the top unit (22) of the frame and includes at least one elongated ram (41) depended therefrom, the second device (39) capable of being programmed to controllably move the ram (41) vertically relative to the slide (28).

The hydraulic press (20) includes a further locking device indicated generally at (42) (FIGS. 1 and 3, and see FIGS. 7-10), shown here connected to the upper part of the slide (28) and operable in a manner described hereinafter to releasably lock itself to the ram (41) at any programmed, incrementally variable location lengthwise of the ram (41). When the locking device (42) is locked to the ram (41), vertical movement of the ram (41) by action of the second hydraulic device (39) is thusly transmitted via the locking device (42) to the slide (28) to move the slide (28) to engage the mold halves (37), (38) to form the article therein.

A positioning assembly, indicated generally at (43) (FIG. 2), may be utilized as a part of the hydraulic press (20), and comprises a quartet of hydraulic cylinder units (44) mounted below the slide (28) for resistably engaging the slide (28) upon downward movement of the slide (28) to engage the mold halves (36), (37); the cylinder units (44) operable also to force the slide upwardly to separate the mold halves (36), (37) for removal of the article being formed or molded.

More particularly, the hydraulic press (20) includes motor (46) and pump (47) units on the top unit (22) thereof, with an auxiliary motor and pump unit (48) also provided and with an oil reservoir (50) also mounted on the top unit (22). An access ladder (49) is provided on one side thereof, and with the base unit (23) supported on and over a ground level (51). The first hydraulic device (31) includes a pair of pull back cylinder units (32), (33) (FIGS. 3-6) mounted on the top unit (22), and each including a cylinder (54) and a piston rod (34) mounted therein, the exposed lower end (57) of the rod (34) being mechanically connected to he slide (28) such that operation of the cylinder units (32), (33) may controllably, vertically move the slide (28) on a vertical axis. Fluid pressure within a chamber (58) formed within each cylinder (54) above the piston rod head (59) can force the rod (34) downwardly, and fluid pressure within the chamber (61) below the head (50) can force the rod (34) upwardly within the cylinder (54).

The second hydraulic device (39) includes not only the ram (41), but a cylinder (62) for the upper head (63) of the ram (41), the ram (41) acting as a piston rod. The cylinder (62) is secured to the top unit (22) of the press (20). As best illustrated in FIGS. 3-6, the ram head (63) is shaped such that a pair of upper and lower fluid chambers (64), (66) and formed within the cylinder (62) whereby fluid pressure on the upper chamber (64) can force the head (63) and ram (41) downwardly as a unit. The ram (41) is externally threaded, the threads (67) being a standard buttress form of screw thread which provide an exceptionally high stress along the thread axis in one direction only, substantially vertical in this instance.

The locking device (42) (FIGS. 7-10) is commercially available, although not used in the present manner to applicant's knowledge. It comprises generally upper and lower plates (68), (69) which are secured as by nuts (71) to the top (72) (FIG. 1) of the slide (28); an outer ring (73) rotatable by one or more cylinder units (74), the ring (73) having a plurality of links (76) pivotally connected at one end by pins (77) thereto; with each link (76) pivotally connected by a pin (78) at the other or inner end to an arcuate-shaped segment (79) with internally threaded, buttress-type threads (81) formed on the inner face (82) thereof for positive locking engagement with and disengagement from the external threads (67) on the ram (41).

Figure 7:
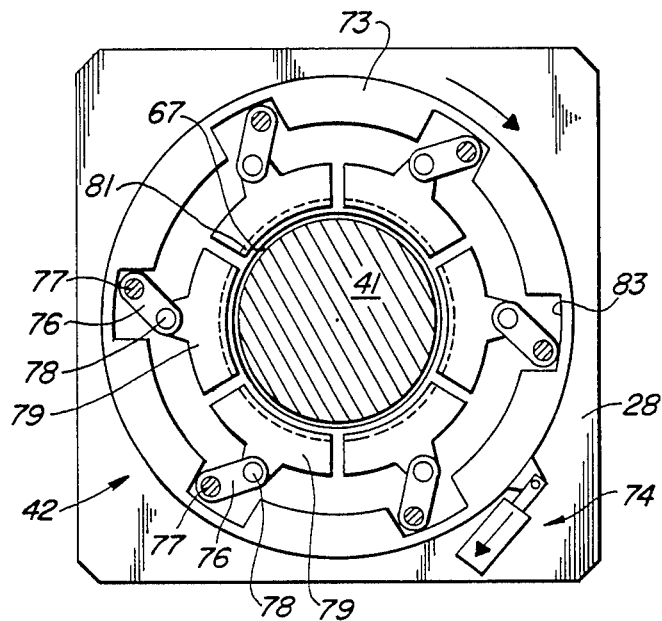
FIG. 7 is an enlarged schematic-type plan view of the locking means as taken along the lines 7—7 in FIG. 1.
Figure 8:
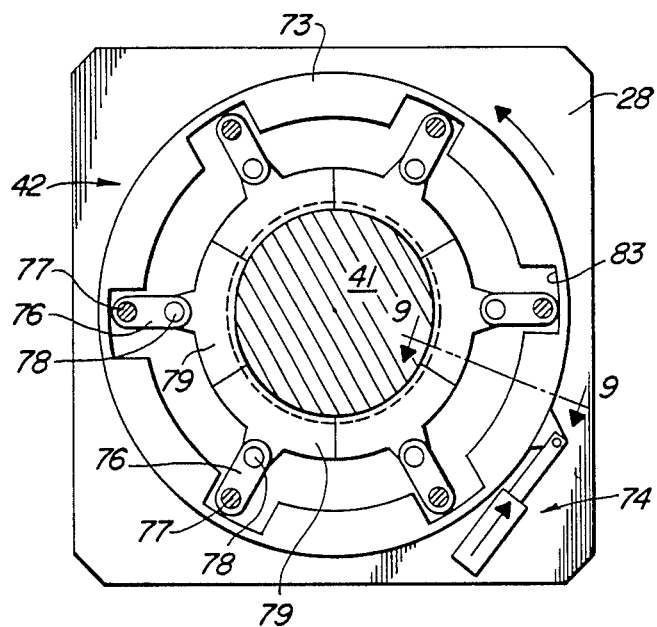
FIG. 8 is a schematic view similar to FIG. 7, with radially movable segments shown in an expanded condition.
Figure 10:
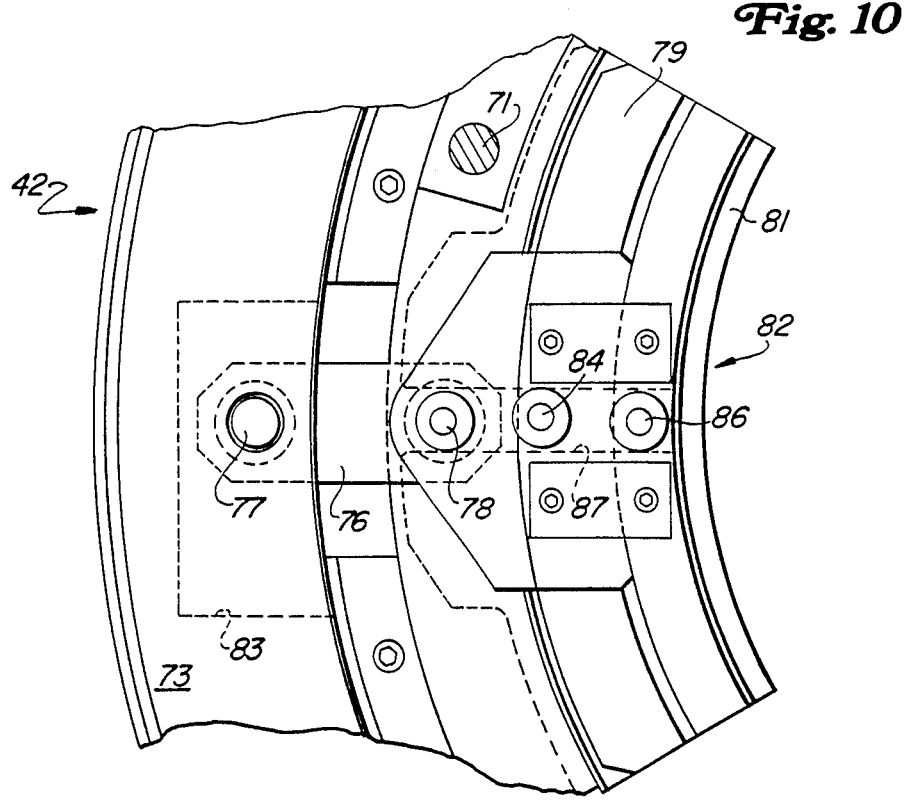
FIG. 10 is a plan view taken along the line 10—10 in FIG. 9.
Figure 9:
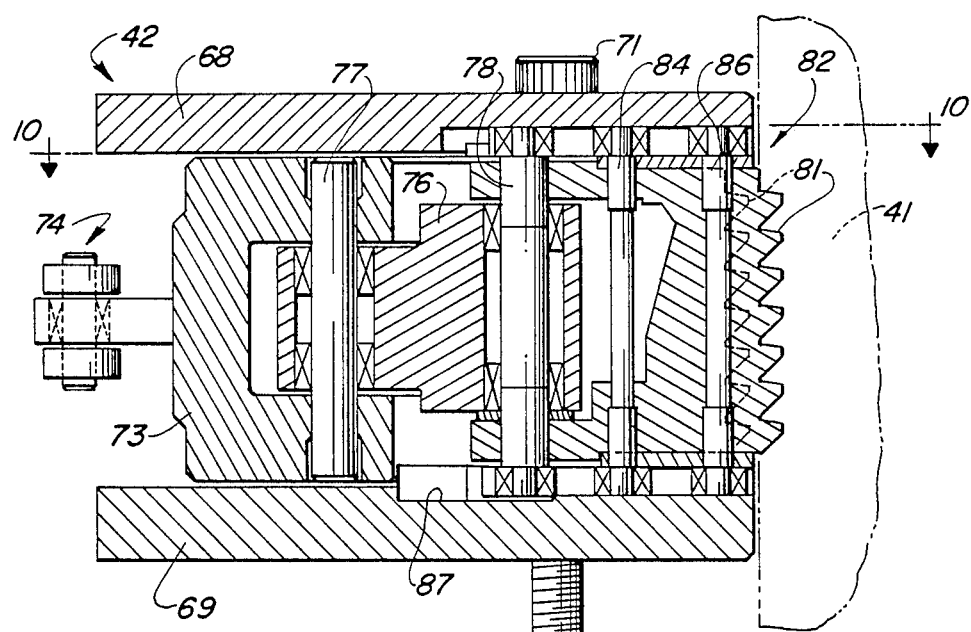
FIG. 9 is an enlarged vertical sectional view as taken along the line 9—9 in FIG. 8.

A cavity (83) is formed, respectively, within the ring (73) for arcuate movement of each link (76) and pin (77) from a segment-retracted condition best shown in FIG. 7, wherein the treads (67) and (81) are not engaged, to a segment-expanded condition best shown in FIG. 8 wherein the threads (67) and (81) are positively engaged. Each segment (79) includes a pair of pins (84), (86) aligned with the inner pin (78), all three pins (78), (84), (86) movable radially within a groove (87), such that upon arcuate movement of the ring (73), radial movement of the pin (78) effects radial movement, inwardly or outwardly, of the pins (84), (86) and the internally threaded segment (79).

Operation of the hydraulic press (20) is best illustrated in FIGS. 3 through 6, and is completely programmable. With the slide (28) in its raised position, the material (not shown) to be formed or molded is placed in the open lower mold half (38). Valves (not shown) for the chamber (66) of each first device cylinder units (33) are controlled for metering fluid therethrough whereby the slide (28) is controllably lowered until it reaches and engages the raised rods (88) of the positioning assembly, at which point further downward movement of the slide (28) is halted by further operation of the valves being controlled by a sensing device (not shown). A reference plane is established by the location of the rods (88) such that if the plane needs to be higher, hand-maneuvered shims may be placed on top of the rods (88). A resistance can be generated in the positioning cylinder units (44) up until the slide reaches the predetermined reference plane.

The locking device (42) is then activated by the cylinder unit (74) to effect movement from an open, retracted condition (FIG. 4) to a closed, locking condition (FIG. 5) relative to the ram (41).

Fluid pressure is then applied to the upper chamber (64) of the main press cylinder (62), thereby forcing the now lowered slide (28) a short distance downwardly against the nonresisting positioning rods (88) until the mold halves (37), (38) are engaged, and whereby the article therein is formed or molded (FIG. 6). It will be noted that the length of movement of the slide (28) to the reference plane (FIG. 4) is considerably longer than the length of movement of the slide (28) for forming the article (FIG. 6). Thus, only a short stroke of the slide (28) under a compression of a nominal volume of fluid is required for the actual article forming operation.

The hydraulic press (20) is operable to slightly cant the slide, within manufacturing tolerances, by a variable resistance to engagement with and compression by the slide (28) being applied to the positioning cylinder units (44). Thus, rather than having the resistance of the units (44) uniform, it may be nonuniform, such that the working surface (89) of the slide (28) is in a two axis plane.

To raise the slide (28) and separate the mold halves (37), (38), the locking device (42) is moved to its unlocked condition (FIG. 7), and the positioning cylinder units (44) may then be activated to raise the slide (28) sufficiently to remove the article having been formed, where upon the pull back cylinder units (32), (33) are then activated to raise the slide (28) to its upper, original position, upward movement of the slide (28) also lifting the ram (41) to its original position. The pull back cylinder units (32), (33) may effect the entire separating and lifting of the slide (28), should the positioning cylinder units (44) not be available.

The press (20) may be altered to effect the same functions described hereinbefore by having the ram (41), slidably movable within the top unit (22), with the cylinder (62) at the lower end of the ram (41) and affixed to the slide (28). With the locking device (42) mounted to the top unit (22), the locking device (42) may lockingly engage the ram (41), thus the hydraulic compression moving the cylinder (62) and slide (28) as a unit downwardly or upwardly relative to the press frame (21). Although the alteration is not shown, it is feasible.

I claim:

1. A hydraulic press for molding or forming an article comprising:
    a frame having a top unit and a base unit interconnected to said top unit;
    a slide adapted to have an upper half of a mold attached thereto;
    first means interconnected between said top unit and said slide for controllably moving said slide vertically relative to said frame;
    a bed fixed on said frame and adapted to have a lower half of the mold attached thereto, the lower mold half adapted to have an article to be molded placed therein;
    second means connected to said top unit and including at least one elongated ram, said second means controllably moving said ram vertically relative to said slide; and
    locking means connected to said slide, said locking means releasably lockable to said ram at any predetermined location lengthwise of said ram and independent of operation of said ram, whereby vertical movement of said ram is transmittable via said locking means to said slide to move said slide to engage said mold halves for forming.

2. The hydraulic press of claim 1 and further wherein said locking means is releasably lockable at incrementally variable locations lengthwise of said ram.

3. The hydraulic press of claim 1 and further wherein said first means includes a plurality of hydraulic cylinder units moving said slide at a first force, and said second means includes a hydraulic cylinder unit moving said slide at a second force greater than said first force.

4. The hydraulic press of claim 1 and further wherein said ram is externally threaded, and said locking means includes radially movable, internally threaded segments for engagement with said ram.

5. The hydraulic press of claim 1 and further wherein said ram has circumferential forms and said locking means has mating circumferential forms radially movable for engagement with the forms on said ram.

6. The hydraulic press of claim 4 and further wherein said locking means includes an outer ring pivotably interconnected by links to said segments, and means for rotating said ring for moving said segments radially between retracted positions spaced from said ram to expanded positions engaging said ram.

7. The hydraulic press of claim 4 and further wherein the threads of said ram and said segments are buttress screw threads.

8. The hydraulic press of claim 1 and further wherein said hydraulic press includes positioning means having a plurality of cylinder units each having a variable resistance to engagement with said slide, whereby the resistance of said positioning means to downward movement of said slide due to operation of said second means is uniform in one condition, and nonuniform in another condition resulting therefore in a canted position of said slide relative to a normal position of said slide in a horizontal plane, said positioning means cylinder units operable to force said slide upwardly to separate said mold halves for removal of the article.

9. A hydraulic press for molding or forming an article comprising:
   a frame having a top unit and a base unit interconnected to said top unit;
   a slide adapted to have an upper half of a mold attached thereto;
   first means interconnected between said top unit and said slide for controllably moving said slide vertically relative to said frame;
   a bed fixed on said frame and adapted to have a lower half of the mold attached thereto, the lower mold half adapted to have an article to be molded placed therein;
   second means connected to said slide and including an elongated ram, said second means controllably moving said ram vertically relative to said top unit; and
   locking means connected to said top unit and releasably lockable to said ram at incrementally variable locations lengthwise of said ram.

10. The process of forming an article comprising the steps:
    placing the material to be formed into the article into a mold lower half held on a fixed bed;
    moving a slide having a mold upper half secured thereto downwardly toward said mold lower half by first hydraulic means;
    sensing said slide reaching a reference plane and halting further movement of said slide by said first hydraulic means;
    locking said slide to the ram of a second hydraulic means;
    moving said slide further downwardly by operation of said second hydraulic means to engage said mold halves with each other whereby to form the article; and
    raising said slide to separate said mold halves hereby the formed article can be removed;
    and further the step of locking said slide to said ram at incrementally variable locations lengthwise of said ram.

11. The process of claim 10 and further the steps of moving said slide by said first means a longer distance than moving said slide by said second means, and applying a hydraulic pressure to said first means less than a hydraulic pressure to said second means.

12. The process of claim 10 and further the step of radially moving a plurality of internally threaded segments from a position spaced from said externally threaded ram, to a position engaged with said ram, and retaining said segments engaged with said slide.

13. The process of claim 10 and further the step of varying the resistance of said hydraulic means to further downward movement of the slide, whereby to cant said slide into a two axis position.

* * * * *